US012783980B1

(12) United States Patent
Samuel

(10) Patent No.: US 12,783,980 B1
(45) Date of Patent: *Nov. 3, 2026

(54) COMPUTER PROGRAM PRODUCT AND COMPUTER-IMPLEMENTED METHOD FOR PRIORITIZING ORDER FULFILLMENT AT A RETAIL SALES FACILITY BASED ON ANTICIPATED CUSTOMER ARRIVAL TIMES

(71) Applicant: Whizzable, Inc., New Hope, PA (US)

(72) Inventor: Steven Samuel, Yardley, PA (US)

(73) Assignee: WHIZZABLE, INC., New Hope, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,628

(22) Filed: Feb. 3, 2025

Related U.S. Application Data

(63) Continuation of application No. 18/206,737, filed on Jun. 7, 2023, now Pat. No. 12,217,202, which is a (Continued)

(51) Int. Cl.
*G06Q 10/0631* (2023.01)
*G01S 19/51* (2010.01)
(Continued)

(52) U.S. Cl.
CPC ........ *G06Q 10/06316* (2013.01); *G01S 19/51* (2013.01); *G06F 16/903* (2019.01); (Continued)

(58) Field of Classification Search
CPC ........... G06Q 10/06316; G06Q 10/087; G06Q 10/1093; G06Q 20/18; G06Q 20/209; (Continued)

(56) References Cited

U.S. PATENT DOCUMENTS 6,684,980 B2 * 2/2004 Hungerford, III ... G06Q 20/203 229/92.8
6,897,763 B2 * 5/2005 Schulmerich ......... G06F 3/1462 705/28
(Continued)

FOREIGN PATENT DOCUMENTS

CA 2765619 A1 * 1/2013 ............. G06Q 10/06
WO WO-0144082 A2 * 6/2001 ............. G06Q 10/08
(Continued)

OTHER PUBLICATIONS

Dima et al"Pull-driven Order Fulfillment in Distribution", Dec. 2018, Georgia Southern Commons, pp. 1-8 (Year: 2018).*
(Continued)

*Primary Examiner* — Romain Jeanty
(74) *Attorney, Agent, or Firm* — Panitch Schwarze Belisario & Nadel LLP

(57) ABSTRACT

Order fulfillment is prioritized at a retail sales facility. A retail sales facility computing device receives purchase request information for a first order from a first customer. The purchase request information comprises identifying information for the first customer and order information for enabling order fulfillment. The retail sales facility computing device also receives location information from a first user equipment device associated with the first order. The received location information includes information identifying the first order. The location information from the first user equipment device comprises GPS-based location information of the first user equipment device that is captured by a GPS device associated with the first user equipment device. The retail sales facility computing device processes the received location information from the first user equipment device together with location information of the retail sales facility to predict an estimated time of arrival (ETA) for the first user equipment device at the retail sales facility.
(Continued)

The location information for the retail sales facility comprises GPS-based location information of the retail sales facility. The ETA prediction is performed using the GPS-based location information of the first user equipment device and the GPS-based location information of the retail sales facility. The retail sales facility computing device schedules a time interval within which to acquire updated location information from the first user equipment device. The order information for the first order and information representative of the ETA for the first user equipment device is placed in an order fulfillment queue for the retail sales facility. The order fulfillment queue further includes order information and an ETA for at least a second order from a second customer. The entries in the order fulfillment queue are ordered in increasing ETA order.

12 Claims, 10 Drawing Sheets

Related U.S. Application Data continuation of application No. 17/692,705, filed on Mar. 11, 2022, now Pat. No. 11,704,614, which is a continuation of application No. 16/934,337, filed on Jul. 21, 2020, now Pat. No. 11,276,020.

(60) Provisional application No. 62/877,078, filed on Jul. 22, 2019.

(51) Int. Cl.

| | |
|---|---|
| ***G06F 16/903*** | (2019.01) |
| ***G06K 19/06*** | (2006.01) |
| ***G06Q 10/087*** | (2023.01) |
| ***G06Q 10/1093*** | (2023.01) |
| ***G06Q 20/18*** | (2012.01) |
| ***G06Q 20/20*** | (2012.01) |
| ***G06Q 30/0601*** | (2023.01) |
| ***G06Q 50/12*** | (2012.01) |
| ***H04W 4/02*** | (2018.01) |
| ***H04W 4/12*** | (2009.01) |

(52) U.S. Cl.

CPC ..... *G06K 19/06037* (2013.01); *G06Q 10/087* (2013.01); *G06Q 10/1093* (2013.01); *G06Q 20/18* (2013.01); *G06Q 20/209* (2013.01); *G06Q 30/0635* (2013.01); *G06Q 50/12* (2013.01); *H04W 4/023* (2013.01); *H04W 4/12* (2013.01)

(58) Field of Classification Search

CPC .... G06Q 30/0635; G06Q 50/12; G01S 19/51; G06F 16/903; G06K 19/06037; H04W 4/023; H04W 4/12

USPC ........................................................ 705/3–44

See application file for complete search history.

(56) References Cited

U.S. PATENT DOCUMENTS

| | | | | |
|---|---|---|---|---|
| 7,627,503 | B1 | 12/2009 | Champagne et al. | |
| 7,945,477 | B2 | 5/2011 | Werbitt | |
| 7,974,873 | B2 | 7/2011 | Simmons et al. | |
| 8,117,086 | B1 * | 2/2012 | Utz .................... | G06Q 30/0635 705/26.81 |
| 8,682,729 | B2 | 3/2014 | Werbitt | |
| 8,732,028 | B2 | 5/2014 | Napper | |
| 9,015,069 | B2 | 4/2015 | Brantley et al. | |
| 9,202,244 | B2 | 12/2015 | Werbitt | |
| 9,275,407 | B2 | 3/2016 | McLaughlin et al. | |
| 9,582,797 | B1 | 2/2017 | Holmes et al. | |
| 9,710,848 | B2 | 7/2017 | Napper | |
| 9,733,633 | B2 | 8/2017 | Wickham et al. | |
| 9,779,375 | B2 | 10/2017 | Grabovski et al. | |
| 9,836,778 | B2 * | 12/2017 | Lyman ............... | G06Q 30/0282 |
| 9,906,907 | B2 | 2/2018 | Trussel et al. | |
| 10,157,414 | B2 | 12/2018 | Werbitt | |
| 10,216,157 | B2 | 2/2019 | Savage et al. | |
| 10,311,530 | B2 | 6/2019 | Becker et al. | |
| 10,326,725 | B2 | 6/2019 | Trussel et al. | |
| 10,351,399 | B2 | 7/2019 | High et al. | |
| 10,467,559 | B1 | 11/2019 | Svenson et al. | |
| 10,902,373 | B2 | 1/2021 | Deshpande et al. | |
| 11,195,224 | B2 | 12/2021 | Werbitt | |
| 2003/0126030 | A1 * | 7/2003 | Hungerford, III ..... | G06Q 10/08 186/52 |
| 2005/0030158 | A1 * | 2/2005 | Schulmerich ......... | G06F 3/1462 340/5.91 |
| 2005/0278062 | A1 * | 12/2005 | Janert .................... | G06Q 10/08 700/214 |
| 2006/0006025 | A1 | 1/2006 | Dev et al. | |
| 2009/0187488 | A1 | 7/2009 | Shamilian | |
| 2012/0078673 | A1 | 3/2012 | Koke et al. | |
| 2012/0209657 | A1 | 8/2012 | Connolly | |
| 2013/0317921 | A1 | 11/2013 | Havas | |
| 2014/0074743 | A1 | 3/2014 | Rademaker | |
| 2014/0195452 | A1 | 7/2014 | Horstemeyer | |
| 2014/0195456 | A1 | 7/2014 | Horstemeyer | |
| 2014/0266616 | A1 * | 9/2014 | Jones ..................... | G06Q 10/08 340/10.1 |
| 2016/0189279 | A1 | 6/2016 | York et al. | |
| 2016/0292664 | A1 | 10/2016 | Gilfoyle | |
| 2017/0287054 | A1 | 10/2017 | Napper | |

FOREIGN PATENT DOCUMENTS

| | | | | |
|---|---|---|---|---|
| WO | 2004095173 | A2 | 11/2004 | |
| WO | 2007041672 | A2 | 4/2007 | |
| WO | WO-2012135143 | A2 * | 10/2012 | ......... G06Q 10/0834 |
| WO | WO-2016166708 | A1 * | 10/2016 | ........... G06Q 10/087 |

OTHER PUBLICATIONS

Home page for “Quick Cup.” Downloaded from Wayback Machine archived web page: <http://www.quickcup.com/>, Wayback Machine archive date: Jun. 28, 2019, original posting date: unknown, 4 pages.

Home page for “My eLane.” Downloaded from Wayback Machine archived web page: http://www.myecup.com/, Wayback Machine archive date: Jun. 7, 2019, original posting date: unknown, 11 pages.

Kara Carlson, “Tech Spotlight: Seattle startup FlyBuy aims to make any restaurant a ‘mobile’ drive-thru.” The Seattle Times, downloaded from: <https://www.seattletimes.com/business/technology/tech-spotlight-seattle-startup-flybuy-aims-to-make-any-restaurant-a-mobile-drive-thru/>, publication date: Jun. 18, 2018, 3 pages.

Taylor Soper, “Meet FlyBuy: This startup helps restaurants, retailers offer roadside pickups.” GeekWire, downloaded from: <https://www.geekwire.com/2015/meet-flybuy-this-startup-helps-restaurants-retailers-offer-roadside-pickups/>, publication date: Oct. 16, 2015, 3 pages.

Joey Haar, “The FlyBuy App Engenders Curbside Pickup for Any Restaurant.” Downloaded from: <https://www.trendhunter.com/trends/flybuy-app>, publication date: Apr. 2, 2018, 6 pages.

Ryan Lawler, “Square’s Order App Can Now Predict When You’ll Arrive to Pick up Your Cappuccino.” TechCrunch, downloaded from: <https://techcrunch.com/2014/10/08/squares-order-app-arrival-prediction/>, publication date: Oct. 8, 2014, 5 pages.

Khushbu Shah, “Square Just Streamlined Your Morning Coffee Run.” Eater, downloaded from: <https://www.eater.com/2014/10/8/6946061/square-streamlined-morning-coffee-run>, publication date: Oct. 8, 2014, 2 pages.

Khushbu Shah, “Square’s Order Ahead App is ‘Very Useful’.” Eater, downloaded from: <https://www.eater.com/2014/11/6/7170449/squares-order-ahead-coffee-app-is-very-useful>, publication date: Nov. 6, 2014, 2 pages.

(56) References Cited

OTHER PUBLICATIONS

Curbside Arrive, "Add Arrive to Your iOS App in Just 6 Steps." Rakuten Ready, downloaded from web page: <https://medium.com/rakutenready/6-steps-to-add-arrival-alerts-to-your-ios-app-a6c1b706d781>, Web page dated: Apr. 4, 2018, 8 pages.

Glympse: How to Tame Customer Hanger (Hunger + Anger) with Location Based QSR Ordering, Glympse.com, Downloaded from: <https://glympse.com/wp-content/uploads/Glympse-How-to-Tame-Customer-Hanger-with-Location-Based-QSR-Ordering.pdf>, Download date: 2019, 8 pages.

* cited by examiner

COMPUTER PROGRAM PRODUCT AND COMPUTER-IMPLEMENTED METHOD FOR PRIORITIZING ORDER FULFILLMENT AT A RETAIL SALES FACILITY BASED ON ANTICIPATED CUSTOMER ARRIVAL TIMES

CROSS-REFERENCE TO RELATED APPLICATIONS

This application is a continuation of copending U.S. patent application Ser. No. 18/206,737 filed Jun. 7, 2023, which, in turn, is a continuation of U.S. patent application Ser. No. 17/692,705 filed Mar. 11, 2022, now U.S. Pat. No. 11,704,614, which, in turn, is a continuation of U.S. patent Ser. No. 16/934,337 filed Jul. 21, 2020, now U.S. Pat. No. 11,276,020, each of which are incorporated by reference herein.

This application claims the benefit of U.S. Provisional Patent Application No. 62/877,078 filed Jul. 22, 2019, the entire disclosure of which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

This disclosure pertains to computer-implemented systems and methods for providing reduced queueing and service times at retail sales facilities, and in particular, physical drive-through queues for purchasing consumables by anticipating customer arrival times.

2. Background

In fast food and other physical retail facilities for consumables, drive-through windows provide a popular mechanism enabling customers to conveniently retrieve purchased items without entry into the facilities. While it is believed that this approach typically reduces the time required for customers to pick up their purchased items, this is not necessarily the case. For example, if the customer arrives at the window without having previously ordering an item remotely, or arrives before the item has been prepared and/or retrieved by retail facility staff, the customer will often find he or she will nevertheless wait at the window or in a holding area until these tasks are completed. If the customer had previously ordered an item but arrives at a time significantly after the item has been prepared, he or she may find themselves waiting for the item to be re-provisioned because it has been misplaced or is no longer in ideal condition (for example, food items such as hot coffee that may have cooled below an ideal serving temperature). For non-food items, knowing when customers will be arriving to pick up previously-placed orders would enable the speed and efficiency of provisioning at that facility to be improved.

It would be beneficial to develop systems and methods that reduce queueing and service times at retail drive-through and other traditional facilities by arranging for item preparation and retrieval to be completed coincidently with customer arrival at the facility. The present invention fulfills this need.

BRIEF SUMMARY OF THE INVENTION

By way of example, aspects of the present disclosure are directed to computer-implemented methods and systems for prioritizing order fulfillment at a retail sales facility, in particular a drive-through kiosk, in order to arranging for item preparation and retrieval to be completed coincidently with customer arrival at the facility. In this fashion, for example, hot food and beverages can be provided to the customer while still hot and cold food and beverages can be served cold. The methods described herein eliminate the "choke points" which slow down the current drive-through fulfillment process, including elimination of the order window/microphone, payment thereafter, and then preparation or retrieval of the item(s) the customer ordered.

In accordance with aspects of the present disclosure, the disclosed computer-implemented method includes the steps of: a) receiving purchase request information at a retail sales computing device that includes identifying information and order information for the first customer, b) receiving location information for the first customer, c) processing the received location information for the first customer together with location information of the retail sales facility to predict an estimated time of arrival (ETA) for the first customer at the retail sales facility, d) scheduling a time interval for acquiring updated location information for the first customer, and e) placing the identifying information, order information and ETA for the first customer in an order fulfillment queue for all current customers. Entries in the order fulfillment queue are positioned in increasing ETA order, whereby order fulfillment activities can proceed according to the order of order requests in the order fulfillment queue. In this manner, the likelihood that orders will be completed at time close to customer arrival is increased over prior art fulfillment methods.

In accordance with an additional aspect of the disclosure, the disclosed computer-implemented method further includes the step of preparing a message for transmission by the retail sales facility computing device to the first customer to indicate a status of order fulfillment for the purchase request.

In accordance with further aspects of the disclosure, the interval in the scheduling step is determined as a function of a distance between the first customer and retail sales facility calculated as a function of the location information for the first customer together and the location information of the retail sales facility. For example, if the customer is more than 5 miles away, the system may "ping" the customer's location at five minute intervals. If the customer is 3 miles away, the interval may be every 3 minutes and if the customer is within a mile of the retail sales facility, the interval may be essentially reduced to result in continuous, real time polling. This progressive interval scheduling approach is intended, in part, to save battery life on a customer's phone.

In accordance with further aspects of the disclosure, the method further includes steps performed by the retail sales facility computing device of: generating an order receipt to be provided to the first customer with an order delivery that includes a scannable identifier (for example, a QR code), receiving a signal including information of the scannable identifier indicating that the order has been delivered, and removing the associated entry for the first customer from the order fulfillment queue.

In accordance with other aspects of the disclosure, the method further includes the steps of: generating a query by the retail sales facility computer to obtain updated location information for the first customer, receiving updated location information for the first customer in response to the query, processing the updated location information for the first customer together with the location information of the retail sales facility to predict an updated ETA for the first customer, and updating the information for the first customer in the order fulfillment queue.

In accordance with further aspects of the disclosure, the location information for the first customer and for the retail sales facility is GPS-based location information.

In accordance with further aspects of the disclosure, the location information received for the first customer at the retail sales facility computing device is initially transmitted by a mobile computing device of the user substantially coincidently with entry of the mobile computing device within a geo-fence of the retail sales facility.

In accordance with additional aspects of the disclosure, the method further includes the step of receiving information by the retail sales facility computer confirming that a payment was made by the first customer in reference to the order request.

This SUMMARY is provided to briefly identify some aspects of the present disclosure that are further described below in the DESCRIPTION. This SUMMARY is not intended to identify key or essential features of the present disclosure nor is it intended to limit the scope of any claims.

BRIEF DESCRIPTION OF THE DRAWINGS

Preferred embodiments of the present invention will now be described by way of example with reference to the accompanying drawings.

A more complete understanding of the present disclosure may be realized by reference to the accompanying drawing in which.

DETAILED DESCRIPTION OF THE INVENTION

Figure 1:
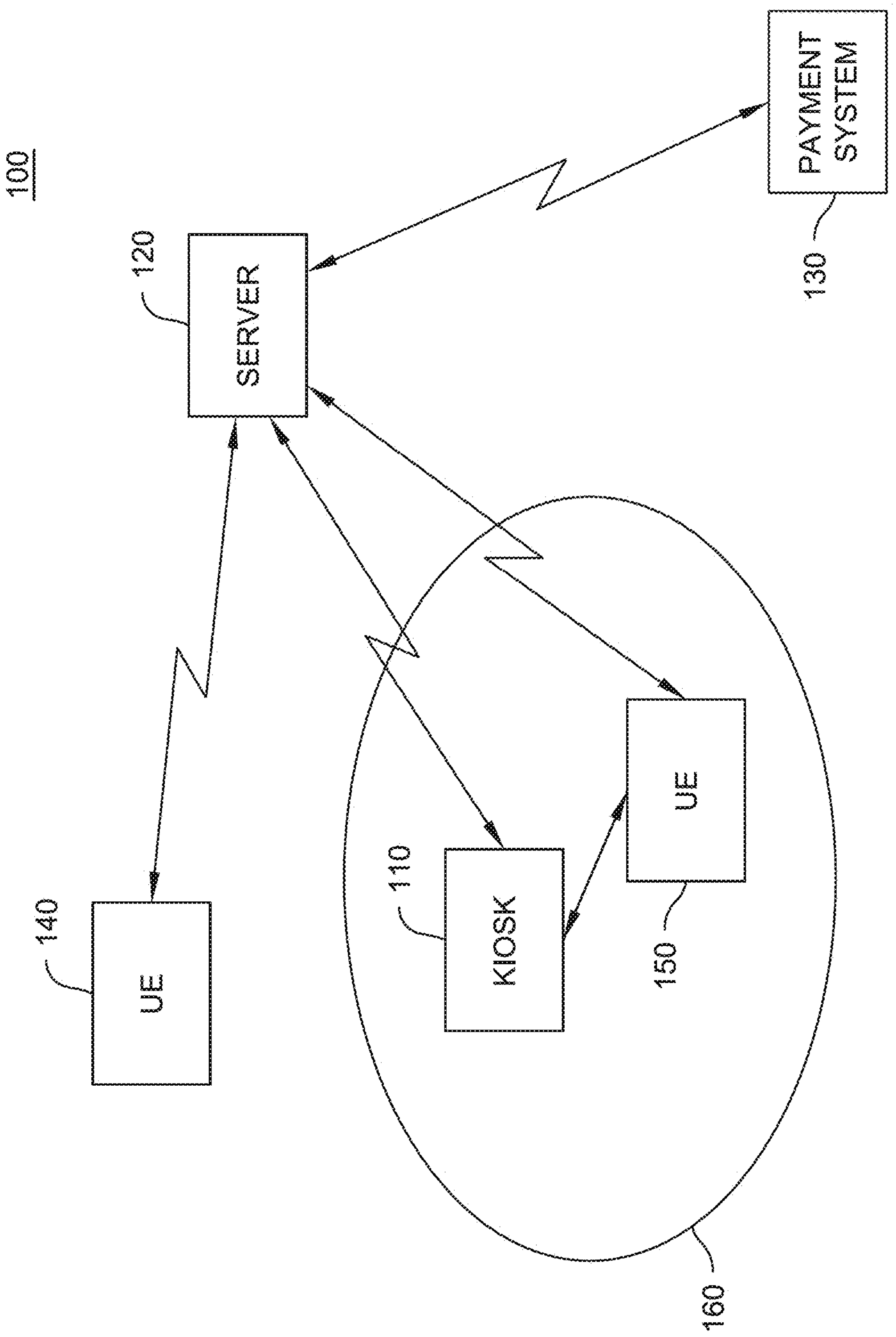
FIG. 1 depicts an exemplary system architecture in accordance with aspects of the present disclosure.

Certain terminology is used herein for convenience only and is not to be taken as a limitation on the present invention. The words "a" and "an", as used in the claims and in the corresponding portions of the specification, mean "at least one."

One preferred embodiment of the present invention is implemented via software code shown below. The software code is subject to the "Copyright Notice and Authorization" stated above.

This patent application includes three Appendices having files named appendix-Part1-689565-1U4.txt, created on Jan. 27, 2025 and having a size of 166,767 bytes; appendix-Part2-689565-1U4.txt, created on Jan. 27, 2025 and having a size of 36,104 bytes; and appendix-Part3-689565-1U4.txt, created on Jan. 27, 2025 and having a size of 66,032 bytes, collectively referred to as "the Appendix." The Appendix is incorporated by reference into the present patent application. One preferred embodiment of the present invention is implemented via the source code in the Appendix. The Appendix is subject to the "Copyright Notice and Authorization" stated above.

The Appendix includes the following parts of software code:

Part 1: Server scripts for Handling API calls (Backend Code-Server Source Code)

Part 2: Kiosk app for handling orders placed through the user app (Retailer/Kiosk code-Kiosk Source Code); and Part 3: User app for placing orders (iOS Code-iOS User App Source Code)

Certain non-ASCII characters are present in two code lines of Part 1. These code lines are presented below, instead of in the Appendix itself to facilitate electronic uploading of the source code. Part 1 of the Appendix includes the following notations regarding these missing lines in their respective locations: [see specification for full line]

The actual lines of code are as follows:

Line 285: $this→error_code=403;

Line 288: if (strlen($token)!=32)||(preg_match('/[\'ˆÃ, Â£$%&*)} {@#~?>< >,|=_+Ã,Â~]/', $token))) {

Part 3 of the code provides an exemplary embodiment for iOS. The functionality of an Android embodiment is the same as the iOS embodiment.

The present invention is described in the context of an application ("app") and corresponding server-side software for a coffee business named "Four Alarm Coffee." However, the scope of the present invention is not limited to any particular type of business or use case, and the present invention may operate in conjunction with any application software program that is used for prioritizing order fulfillment at a retail sales facility.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale. Aspects of the present disclosure are directed to systems and methods for providing reduced queueing and service times at physical drive-through facilities for purchasing consumables. An exemplary system architecture 100 for the disclosed systems and method is depicted in FIG. 1. The system architecture 100 includes one or more customer mobile electronic devices 140, 150 (also termed "User Equipment Devices," or "UE devices") that are equipped for communications in one or more of a conventional telephony or wireless data network. Such devices may include, but are not limited to, personal digital assistants (PDAs), smartphones, tablet devices, and other devices capable of executing software application programs that may have been pre-installed in a non-activated state on the device, or are dynamically installed, for example, in a non-activated state via a network connection to a system that offers software applications and features for download and licensing, e.g., App Store, ("AS"). These software applications are programs stored in the UE device, together with a UE operating system to be activated and then executed by a processor of the device when execution is triggered, that is when the application is started.

The system architecture 100 may further include a retail sales facility computing device (kiosk 110) that is capable of communicating via one or more of the conventional telephony or wireless data networks with a server computer ("Server 120") and the UEs 140, 150. The kiosk 110 may for example preferably comprise a tablet computer or other computing device capable of executing software application programs and having a display well-suited to be viewed by workers in the retail sales facility. The Server 120 is also preferably equipped to communicate via one or more of the conventional telephony or wireless data networks with one or more payment systems 130, or alternatively, is equipped to directly facilitate payments made electronically by customers via the UEs 140, 150. The server may be co-located with the kiosk 110 or at an alternate site and accessible via a telephony or wireless data network. Alternatively, the functions performed by the server 120 and kiosk 110 as described herein may be implemented in a single computing device at the retail sales facility.

Kiosk 110 may preferably be associated with geo-fence 160, which defines a physical area surrounding the kiosk 110 within which it will be desirable to monitor the location of customers via location services of the UEs 140, 150 under customer control.

Figure 2:
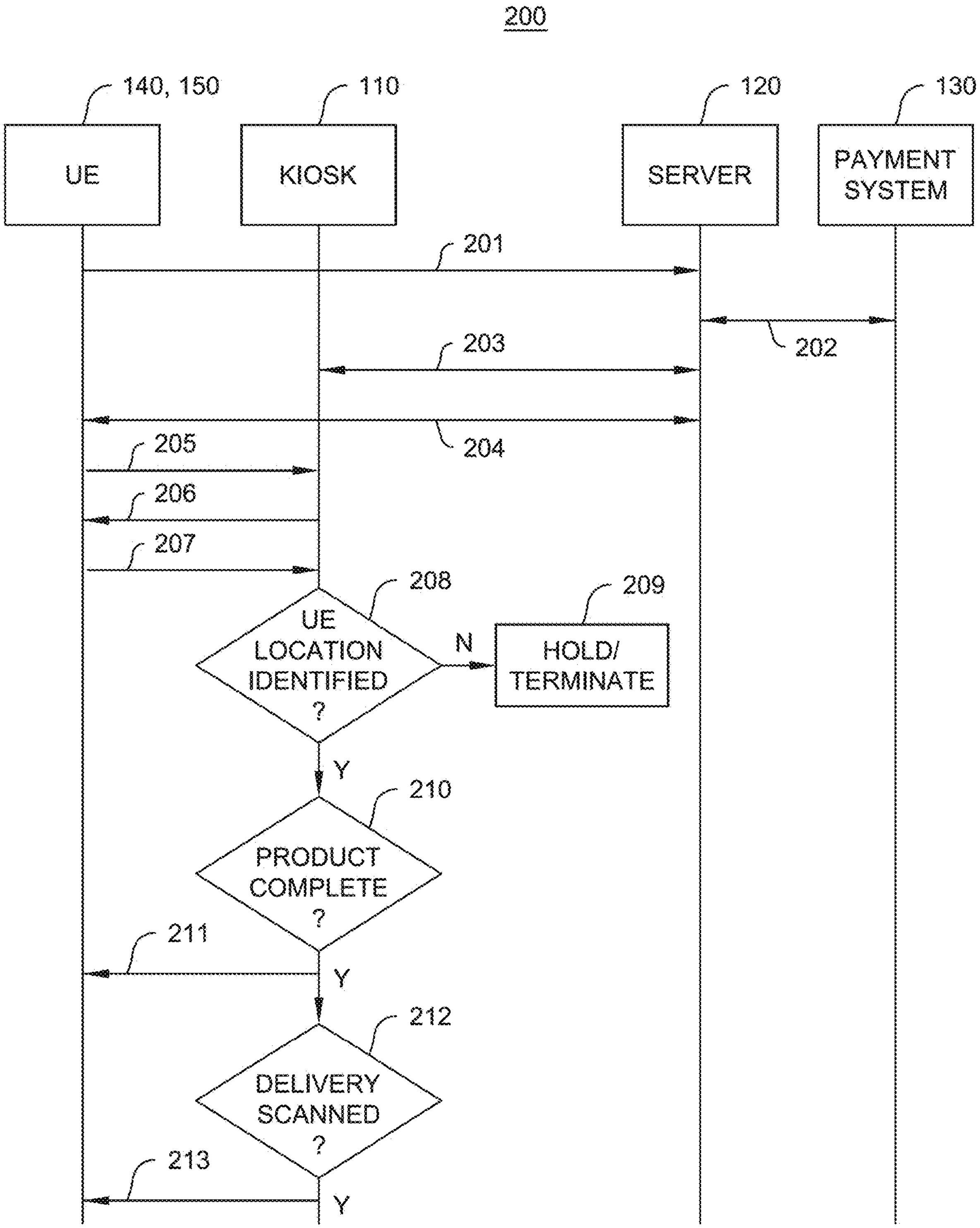
FIG. 2 depicts an exemplary message sequence diagram in accordance with aspects of the present disclosure.

FIG. 2 illustrates a message sequence chart 200 according to further aspects of the present disclosure that depicts a computer-implemented method carried out with the elements of system architecture 100 for managing the preparation and delivery of a consumable product for a customer at the retail kiosk 110. For purposes of illustration, and without limitation, the chart 200 is described with reference to a retail kiosk 110 that provides coffee products. One of skill in the art will readily recognize that the examples presented and principles described are applicable to any of a number applications having customers that travel to a retail location for order pickup.

The process illustrated by chart 200 begins at step 201 with a request prepared by a customer via one of the UEs 140, 150 to order a coffee product. The customer may prepare the request, for example, by opening and operating a purchase app that is resident on the UE 140,150 for this purpose. The app engages one or more communications modules of the UE 140,150 to transmit information associated with the request over one or more of a telephonic or wireless data network to the computer server 120, on which is stored a purchase application for this purpose. The server 120 may reside at any of a number of physical locations, including at the physical location of the kiosk 110.

The server 120 may then proceed to qualify the order, for example, by confirming the status of the customer as defined within a local database of the server or other non-local database, and/or by querying and obtaining approvals to proceed from a third-party payment system 130 at step 202. The third-party payment system may authorize the purchase based on pre-arranged payment details of the customer, or by communicating with the client in real time to confirm payment details via the UEs 140, 150.

Upon qualifying the request, the server may proceed at step 203 to transfer information about the order to the retail kiosk 110. This information may, for example, preferably include information identifying the customer (Customer ID), the product(s) being purchased (Items), and instructions concerning preparation and/or packaging of the product for delivery to the customer (Particulars). The kiosk 110 may then preferably confirm receipt of the request with the server 120.

At step 204, preferably after receiving confirmation from the kiosk 100, the Server 120 may communicate with the customer via UE 140, 150 to confirm placement of the order at the kiosk 110, and to request that the UE 140, 150 enable a location services feature to enable the UE 140, 150 to be tracked by the kiosk 110 within the geo-fence 160. Enablement of the location services feature of the UE 140, 150 may, for example, be automatically provided by opening the purchase app that is resident on the UE 140, 150, or may be provided after receiving specific approval by the user of the UE 140, 150. Alternatively, the kiosk 110 may registered in the purchase app, and locations services for the kiosk 110 may be automatically enabled so long as the app has been opened or while an order to be fulfilled at the kiosk 110 is pending.

At step 205, and preferably at or near the time of entry of the UE 140, 150 within the area defined by the geo-fence 160, the UE 140, 150 activates its location services feature to notify the kiosk 110 with regard to its position within the geo-fence 160 (for example, by sending information indicating a current GPS position of the UE 140, 150).

Following entry of the UE 140, 150 within the geo-fence 160, kiosk 110 at step 206 periodically requests UE 140, 150 to update its current position within the geo-fence 160. Timing between requests may be fixed (for example, at three-minute intervals), or may depend upon a last known position of the UE 140, 150. For example, time between requests may be reduced as the position of the UE 140, 150 nears the position of the kiosk 110.

The UE 140, 150 is expected to reply to the requests made by the kiosk 110 at step 207. At step 208, if the kiosk 110 fails to receive a timely reply from the UE 140, 150 that identifies its position within the geo-fence 160 (for example, by the midpoint of the interval to the next position request), the kiosk 110 may at step 209 place a hold on the order (for example, if fulfillment activities at the kiosk 110 have not begun). The hold may, for example, be released upon receiving a next location reply from the UE 140,150. If fulfillment activities have begun, the kiosk 110 may place a hold on the order and determined whether the item being fulfilled can be properly re-directed to another order. In the event that the kiosk 110 continues to have difficulty receiving location replies from the UE 140,150, the kiosk 110 may elect to terminate the order.

At step 210, the kiosk 110 may monitor the status of fulfilling the order request of UE 140, 150. Upon completion, at step 211, the kiosk 110 may transmit an order completion status message to the UE 140,150 (for example, by means of a text or automated phone message). Optionally, the kiosk 110 may elect to transmit additional status messages to the UE 140,150 during the order fulfillment process (for example, indicating anticipated time until order completion).

Upon arriving at the kiosk 110, the customer using UE 140,150 may expect to find that his or her order is ready for pickup. For identification purposes, it is preferred that each order have a receipt attached that identifies the purchaser and the items included in the order. For example, on a fulfillment queue display inside the kiosk 110, there may be a "print" icon in a row of information presented for each customer order. When the order has been prepared, the print icon may be executed to print a small label which will be affixed to the customer's purchase. The label preferably the unique customer ID, as well as information identifying the item(s) purchased. In addition, the label may preferably include a scannable order identifier (for example, a QR code or RFID). At step 212, at the time of delivery of the order, the order identifier may be scanned to enable the kiosk 110 to determine that the order has been delivered.

At step 213, the kiosk 110 may transmit a congratulatory message to the UE 140, 150. The congratulatory message may, for example, be used to solicit customer feedback, or to notify the customer in regard to customer loyalty points earned and provide access to customer loyalty program redemption mechanisms. In addition, the congratulatory message may be used by the app on the UE 140,150 as a signal for terminating location service access by the kiosk 110. Alternatively or in addition, the app on the UE 140, 150 may terminate these services when the UE 140,150 leaves the geo-fence 160, at a specific time after the purchase app has been opened on the UE 140,150, and/or when the user closes the purchase app on UE 140,150.

Figure 3:
FIG. 3 illustrates an exemplary service screen for a retail facility in accordance with aspects of the present disclosure.

FIG. 3 illustrates an exemplary service screen 300 for tracking order fulfillment as kiosk 110. In this illustrated example, the orders relate to various coffee/beverage products. As previously noted, the principles illustrated herein are readily applicable to any of a variety of other retail applications. The screen 300 provides a listing of open orders to be fulfilled at the kiosk 110, and may be prepared by software and data management applications resident on either or both of the server 120 and the kiosk 110. Data are presented in a table format. Column 301 (Customer ID) of the screen 300 lists customer identifiers for each of the orders in the fulfillment queue. These identifiers preferably provide a unique identifier for each customer, and may be assigned for example by the server 120 according to a naming rule convention (for example, including a first name portion and a serial number portion) or selected by the customers themselves according to predetermined rules and availability as a unique identifier.

Column 302 of the screen 300 identifies each product included in a customer order (Item). Preferably, each item can be selected by a user from a checkbox list presented to the user by the purchase app on the UE 140,150. Column 303 (Particulars) identifies additional ordering options and instructions relating to each identified product in column 302. Here again, the options are preferably selected by a user from a checkbox list presented to the user by the purchase app on the UE 140,150. Each of the Customer ID 301, Item 302 and Particulars 303 are determined from information provided in the order request 201 previously described with reference to FIG. 2.

In one preferred embodiment, as shown in FIG. 3, each item in an order is listed in a separate row, and items which belong to the same order are grouped together with the same customer ID, and same color or shading. Adjacent customer orders are presented in a visually different color or shading.

Column 304 of the screen 300 provides an estimated time of arrival (ETA) for the user's arrival and order delivery at the kiosk (for example, as may be preferable calculated by a GPS-based navigation app with access to traffic data). The ETA calculation may also optionally be informed by additional information (for example, an estimated ETA provided by the user).

The software and data management applications resident on server 120 and/or kiosk 110 may operate to sort the entries on the service window in ascending ETA order. This ordering in the service window guides the order fulfillment workflow for service staff at the kiosk 110. Based on data captured at the kiosk 110 with respect to order fulfillment times associated with individual products, and not shown in FIG. 3, the screen 300 may optionally present additional columns providing estimates for fulfillment intervals and recommended fulfillment activity start times based on customers' expected arrival times. Alternatively, rows in the screen 300 presenting particular order details may be color-coded to highlight orders where fulfillment activities have or should have begun and to assist staff in easily discerning distinct orders. For example, the rows in screen 300 may be color-coded to identify the associated staff member who is preparing each order.

When an order has been completed by a service staff member, the member may click for example on a print icon in column 305 to transfer the order from open to complete status, and print an associated receipt and/or delivery label to be applied to or accompany the order. As described with reference to step 211 of FIG. 2, printing of the receipt or delivery label by means of the icon presented in column 305 may preferably cause the software and data management applications resident on server 120 and/or kiosk 110 transmit an order completion status message to the UE 140,150 (for example, by means of a text or automated phone message).

As noted above in the description accompanying FIG. 2, UE 140, 150 may periodically be queried by kiosk 110 for updated location information, in order to re-estimate ETA. Entries on the service window 300 are preferably re-ordered in real time according to the re-estimated ETAs.

Completed or terminated order entries may be removed from the service screen immediately or within a fixed-time after completion, or removed manually at the time of completion by service staff. Alternatively, these entries may remain on the list for some predetermined time period, and preferably moved to an off-screen position.

Users who fail to arrive at the kiosk to pick up their orders within a predetermined time following the estimated ETA may preferably receive a final reminder message including, if applicable, an indication as to when the order will no longer be available for pick-up.

It will be understood that, while various aspects of the present disclosure have been illustrated and described by way of example, the invention claimed herein is not limited thereto, but may be otherwise variously embodied within the scope of the following claims. For example, it should be understood that while the estimated ETA for each customer has been described as data calculated by the kiosk 110 and/or server 120, it is also possible that this calculation could be performed for each customer by that customer's UE 140, 150.

The following table lists the reference characters and names of features and elements used herein: Reference characters assigned to method steps are not listed.

| Ref. char. | Feature or element |
|---|---|
| 100 | System Architecture |
| 110 | Retail Kiosk |
| 120 | Server |
| 130 | Payment System |
| 140 | User Equipment |
| 150 | User Equipment |
| 160 | Geo-fence |

Figure 4:
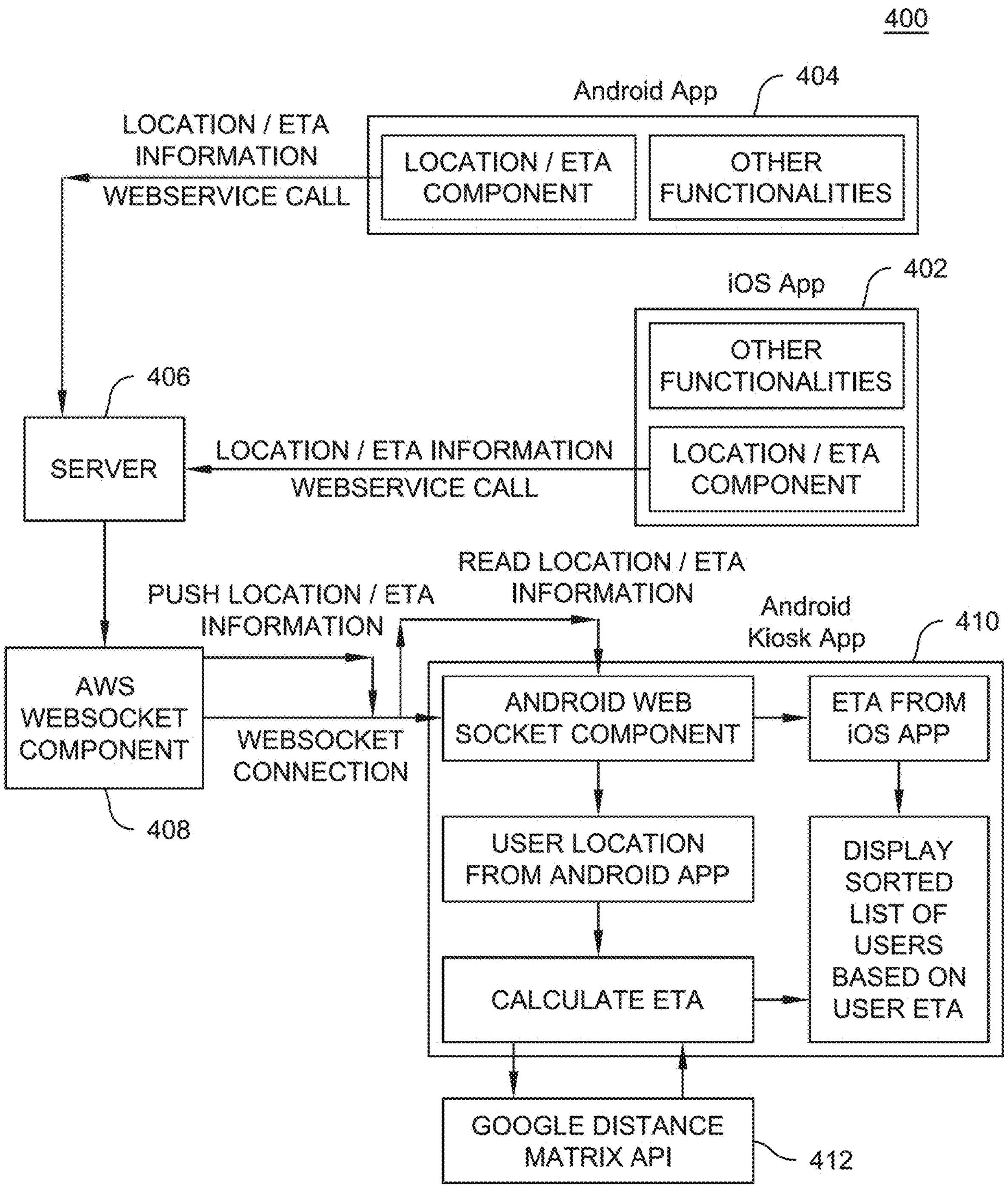
FIG. 4 is a system communication architecture diagram in accordance with one preferred embodiment of the present disclosure.

FIG. 4 is a system architecture diagram in accordance with one preferred embodiment of the present disclosure.

Referring to FIG. 4, system 400 includes Four Alarm iOS app 402 and Android app 404 which keep track of device location for a particular user. The type of mobile device will determine which type of app is executing. Once the user selects a kiosk to place an order, the iOS app 402 or Android app 404 accesses the kiosk location available in the app and calculates the ETA for the user to reach the kiosk. This ETA is sent to server 406 via web service call. As device location gets updated, the app 402 or app 404 sends the updated ETA to the server 406. Updated locations are sent to the server 406 as and when the device location gets updated. The server 406 performs the same functions as the server 102 in FIGS. 1 and 2, The server 406 hands over the location/ETA information received from the apps 402 and 404 to the AWS WebSocket component 408. The AWS component 408 pushes this information to an Android Kiosk app 410 that is connected to it via WebSockets. In the event that the kiosk app WebSocket connection gets disconnected, it reconnects again to the AWS component 408. A GOOGLE Distance Matrix API 412 may be used to calculate ETA. It should be understood that each user will have a mobile device that executes either an ios App 402 or an Android app 404, and that each retail sales facility executes its own Android Kiosk app 410, and that FIG. 4 only illustrates one of each of these elements. The server 406 may service multiple retail sales facilities, each executing their own Android Kiosk app 410.

FIGS. 5A-5F show selected customer-facing user interface display screens. In one embodiment, these display screens are presented within an app 402 or 404 executing on a user's mobile device. Certain conventional-type display screens are not shown, such as splash screens, login screens, payment setup screens, settings screens, and the like. A summary of the user interface display screens is provided below.

Figure 5A:
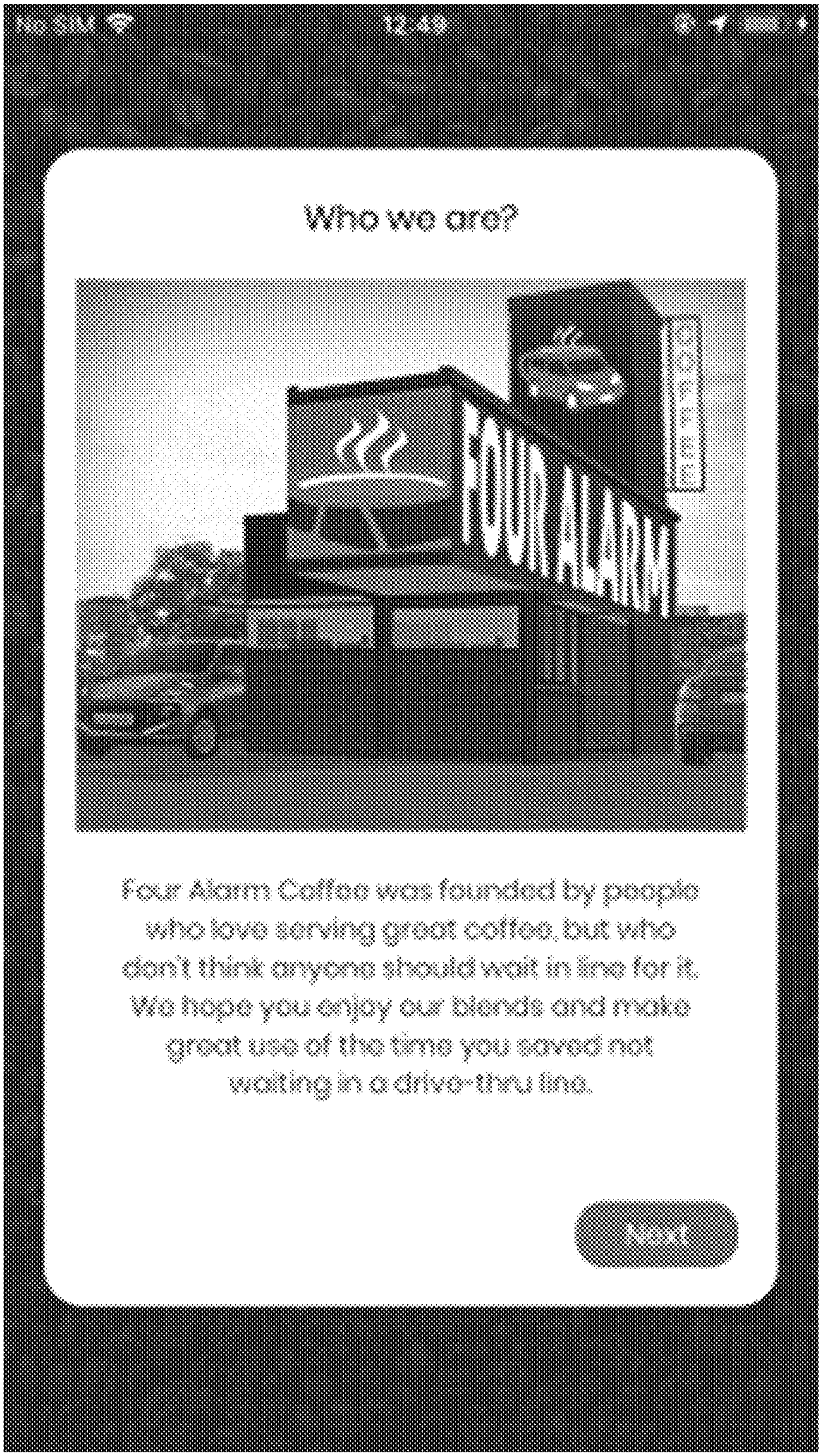
FIGS. 5A-5F show selected customer-facing user interface display screens for one preferred embodiment of the present disclosure.

FIG. 5A: Who we are. Shown after the splash screen to first-time users.

Figure 5B:
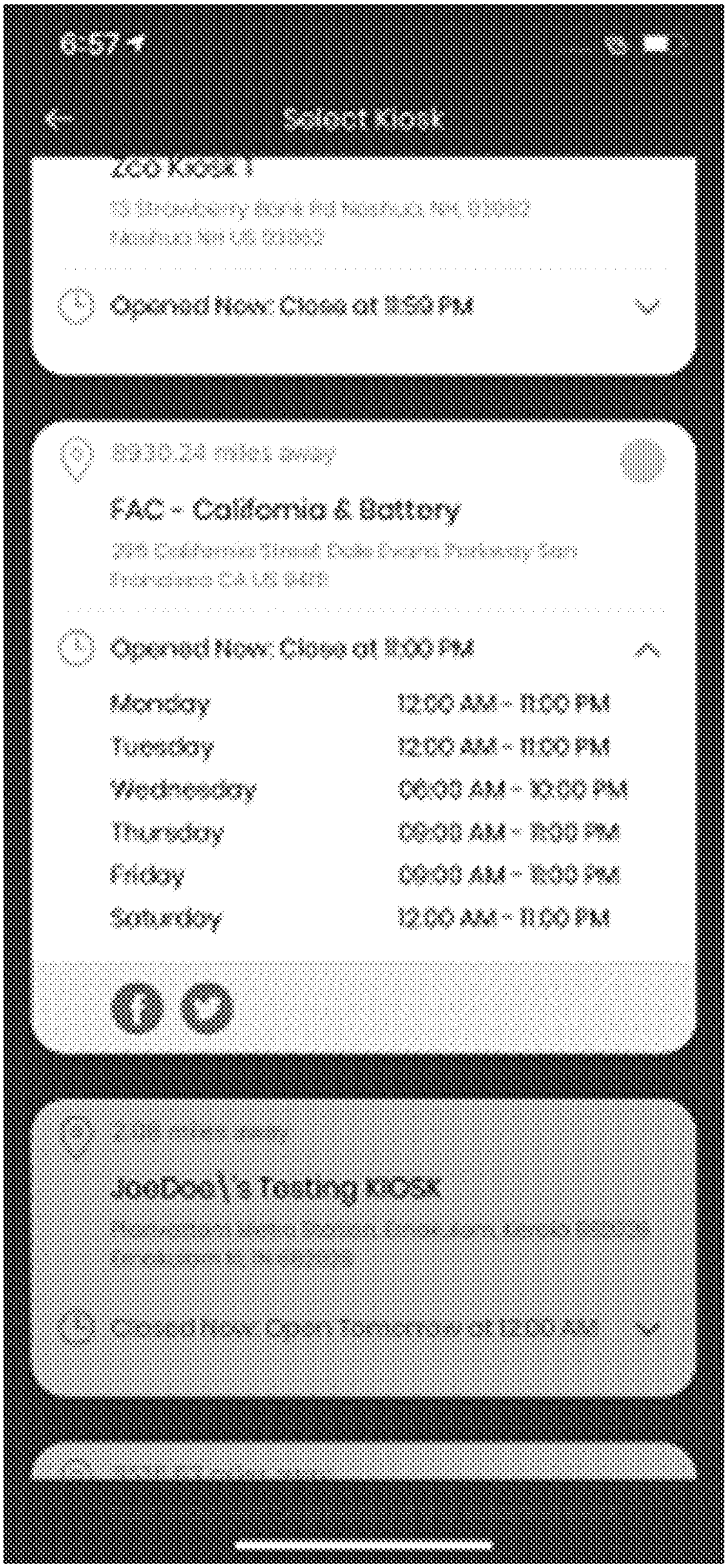

FIG. 5B: Select kiosk. The nearest kiosk based on the location of the user is shown by default in a display screen (not shown) that appears after the FIG. 5A display screen. However, a user may select a different location, if desired, by selecting a dropdown icon next to the currently shown location. This causes the display screen of FIG. 5B to appear.

Figure 5C:
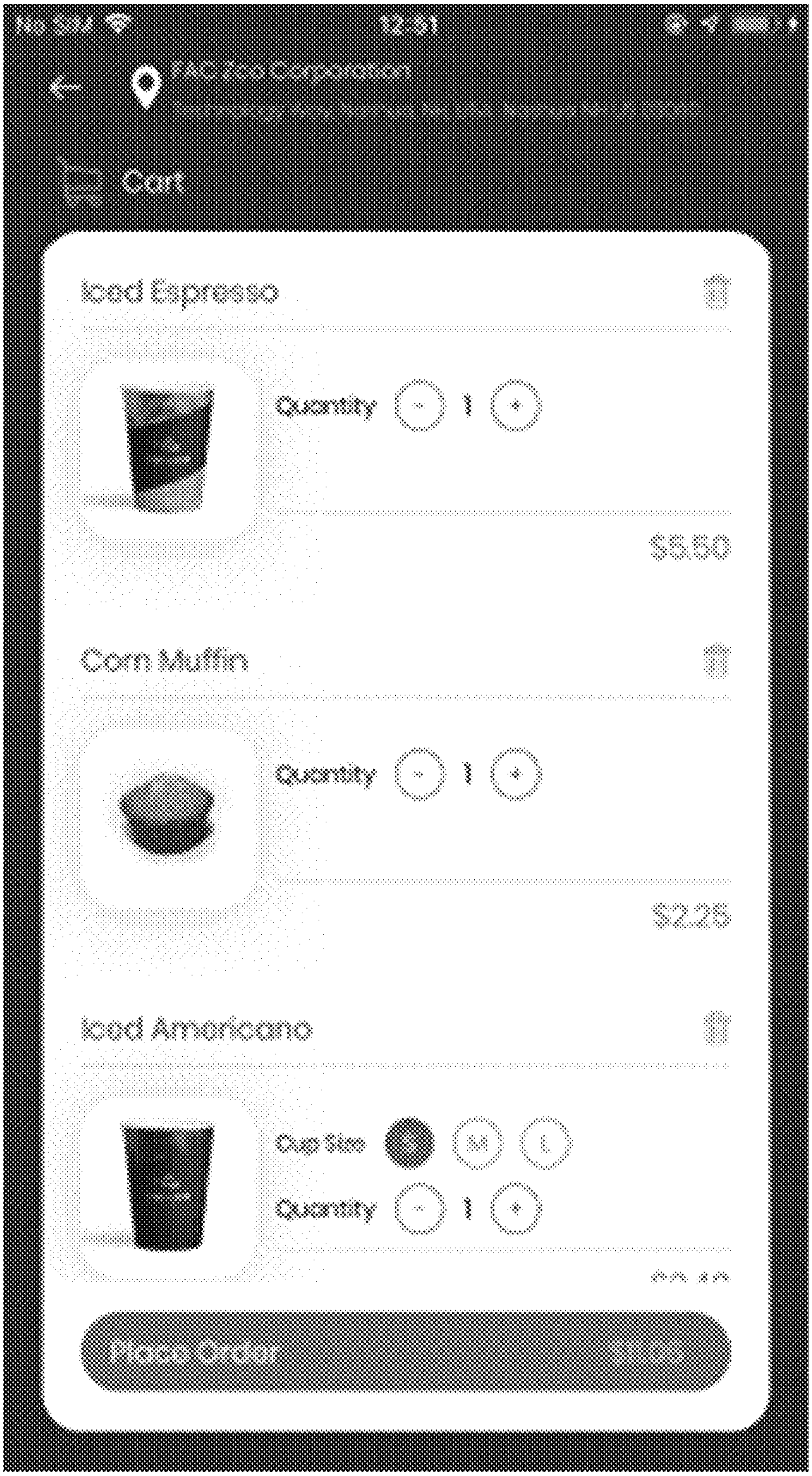

FIG. 5C: Cart. Items that are available from the selected location are displayed and a user selects a quantity and cup size (if the item is a beverage). Selected items are added to a shopping cart. FIG. 5C shows the cart. Tapping "Place Order" shows a login alert to those users who are not currently logged in, or navigates directly to a payment screen if the user is already logged in.

Figure 5D:
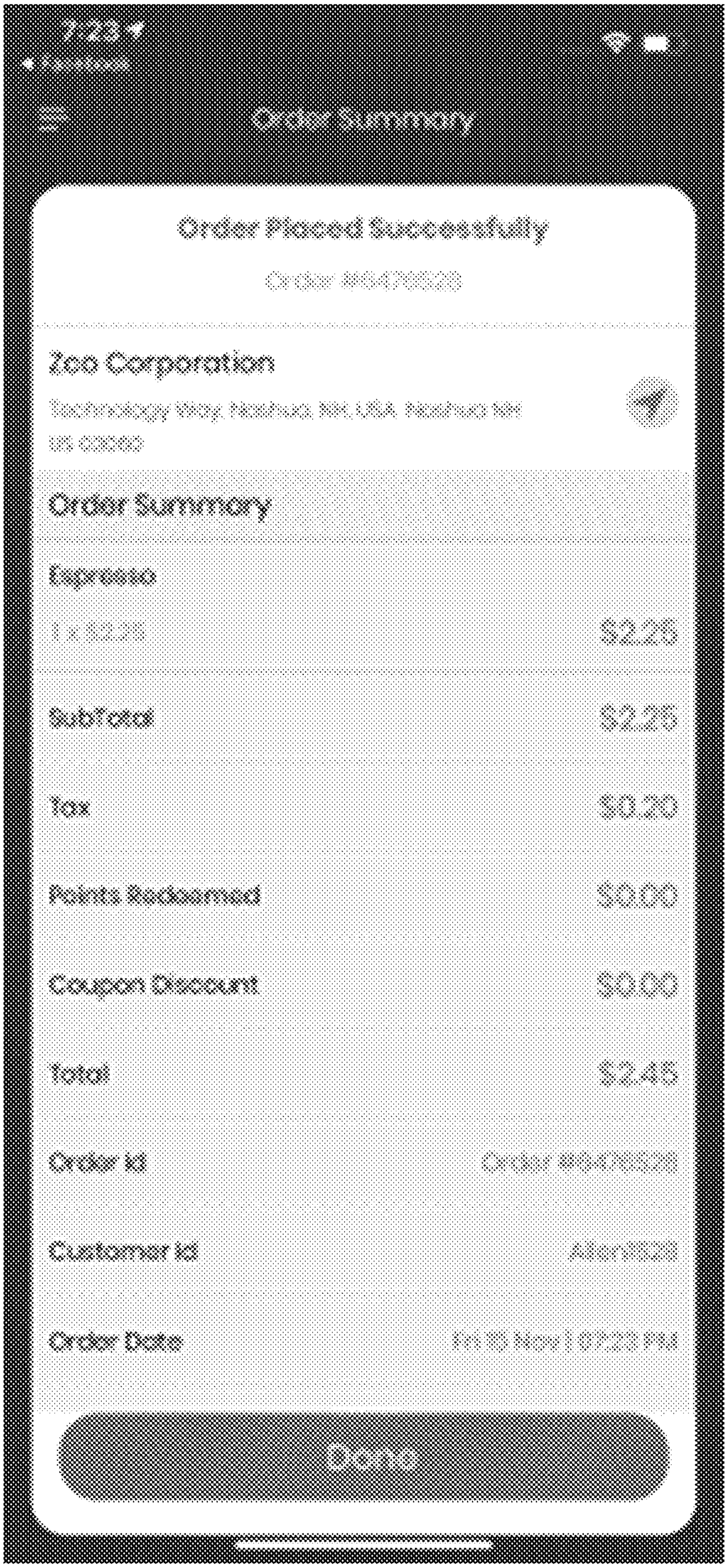

FIG. 5D: Order Summary. The order is assigned an order ID number which is associated with the customer ID. Another display screen (not shown) may show all current, not yet picked up, orders.

Figure 5E:
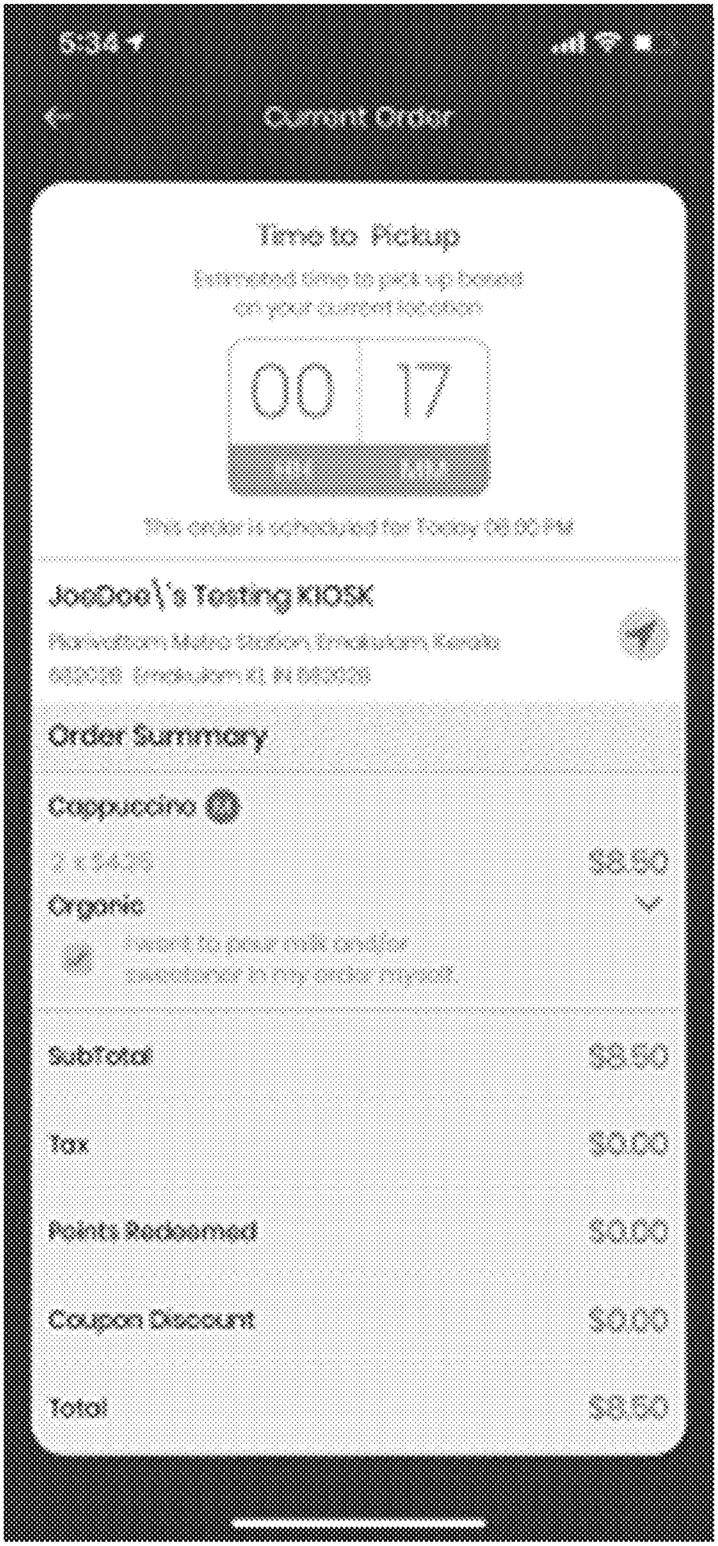

FIG. 5E: Order Summary with pick up time. This display screen shows the estimated time to pick up based on the user's current location. In one embodiment, this display screen is only shown for orders that are set to "auto order." For example, a user may preset an order for each weekday at 6:00 μm. However, the same type of display screen may be used for on-the-fly (not "preset" orders). In another embodiment, this display screen is not shown for on-the-fly orders. Thus, the customer simply makes their order, and then proceeds to the kiosk without receiving any feedback via the app regarding when their order will be ready.

Figure 5F:
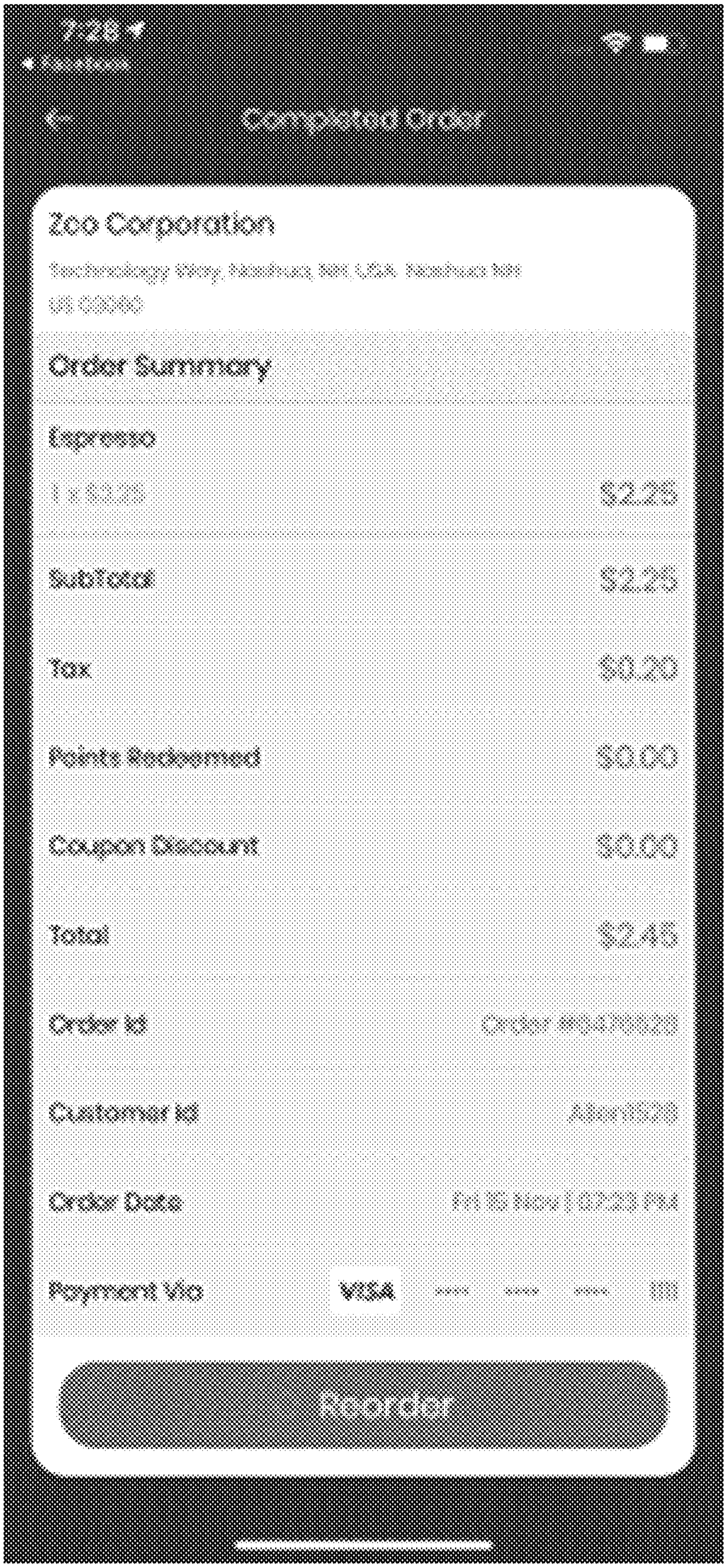

FIG. 5F: Reorder. A user may review previous orders on a display screen (not shown) and select one of the previous orders to reorder. FIG. 5F shows a summary display screen of a previous order that has been selected to reorder.

A series of separate menus (not shown) allow the user to set up "auto orders." As discussed above, the "auto order" designates desired days (e.g., weekdays, weekends, specific upcoming days) and a time of day for pick up. A separate display screen for "Auto Orders" shows active and inactive "auto orders." A ON/OFF toggle switch may be used for each "auto order." However, in one preferred embodiment, only one "auto order" may be active at a time.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers. The computers/processors referred to herein include computers/processors in the server 102/406 and in the one or more customer mobile electronic devices 140, 150.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for prioritizing order fulfillment at a retail sales facility, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

ADDITIONAL CONSIDERATIONS

Geo-Fence (Geofence)

As is well-known in the art, a geofence is a virtual perimeter for a real-world geographic area. The area of the geo-fence 160 described herein may be defined by selecting a radial distance from a point location, here, the retail sales facility. Alternatively, the geo-fence may be a predefined set of boundaries that form a polygonal shape, wherein the location of the retail sales facility is inside of the polygon.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A computer program product for prioritizing order fulfillment at a retail sales facility, the computer program product comprising a non-transitory computer readable storage medium tangibly embodying computer-executable program instructions thereon that, when executed, causes a computer system that includes one or more computer devices to:

(a) receive, at a retail sales facility computing device, purchase request information for a first order from a first customer, and wherein the purchase request information comprises identifying information for the first customer and order information for enabling order fulfillment;

(b) receive, at the retail sales facility computing device, location information from a first user equipment device associated with the first order, the received location information including information identifying the first order, wherein the location information from the first user equipment device comprises GPS-based location information of the first user equipment device that is captured by a GPS device associated with the first user equipment device;

(c) process, by the retail sales facility computing device, the received location information from the first user equipment device together with location information of the retail sales facility to predict an estimated time of arrival (ETA) for the first user equipment device at the retail sales facility, wherein the location information for the retail sales facility comprises GPS-based location information of the retail sales facility, and wherein the ETA prediction is performed using the GPS-based location information of the first user equipment device and the GPS-based location information of the retail sales facility;

(d) schedule, by the retail sales facility computing device, a time interval within which to acquire updated location information from the first user equipment device; and (e) place the order information for the first order and information representative of the ETA for the first user equipment device in an order fulfillment queue for the retail sales facility, wherein the order fulfillment queue further includes order information and an ETA for at least a second order from a second customer, and wherein entries in the order fulfillment queue are ordered in increasing ETA order.

2. The computer program product of claim 1 wherein the retail sales facility includes a display screen showing open orders to be fulfilled, wherein the computer-executable program instructions, when executed, further causes the computer system to:

(f) generate and display on the display screen recommended fulfillment activity start times for items in the customers' orders based on order fulfillment times of the items and the customers' ETA's.

3. The computer program product of claim 1 wherein the first user equipment device is associated with the first customer.

4. The computer program product of claim 1 wherein the computer-executable program instructions, when executed, further causes the computer system to:

(f) transmit from the retail sales facility computing device an order completion status message to the first user equipment device when the retail sales facility has completed the first order.

5. The computer program product of claim 1 wherein the computer-executable program instructions, when executed, further causes the computer system to:

(f) transmit from the retail sales facility computing device a query to the first user equipment device to receive updated location information from the first user equipment device; and (g) update the order fulfillment queue using any updated location information received from the first user equipment device.

6. The computer program product of claim 1 wherein the computer-executable program instructions, when executed, further causes the computer system to:

(f) transmit from the retail sales facility computing device a query to the first user equipment device to receive updated location information from the first user equipment device; and (g) place the first order on hold, and remove the order information for the first order from the order fulfillment queue when no updated location information is received from the first user equipment device.

7. A computer-implemented method for prioritizing order fulfillment at a retail sales facility, the method comprising:

(a) receiving, at a retail sales facility computing device, purchase request information for a first order from a first customer, and wherein the purchase request information comprises identifying information for the first customer and order information for enabling order fulfillment;

(b) receiving, at the retail sales facility computing device, location information from a first user equipment device associated with the first order, the received location information including information identifying the first order, wherein the location information from the first user equipment device comprises GPS-based location information of the first user equipment device that is captured by a GPS device associated with the first user equipment device;

(c) processing, by the retail sales facility computing device, the received location information from the first user equipment device together with location information of the retail sales facility to predict an estimated time of arrival (ETA) for the first user equipment device at the retail sales facility, wherein the location information for the retail sales facility comprises GPS-based location information of the retail sales facility, and wherein the ETA prediction is performed using the GPS-based location information of the first user equipment device and the GPS-based location information of the retail sales facility;

(d) scheduling, by the retail sales facility computing device, a time interval within which to acquire updated location information from the first user equipment device; and (e) placing the order information for the first order and information representative of the ETA for the first user equipment device in an order fulfillment queue for the retail sales facility, wherein the order fulfillment queue further includes order information and an ETA for at least a second order from a second customer, and wherein entries in the order fulfillment queue are ordered in increasing ETA order.

8. The computer-implemented method of claim 7 wherein the retail sales facility includes a display screen showing open orders to be fulfilled, the method comprising:

(f) generating and displaying on the display screen recommended fulfillment activity start times for items in the customers' orders based on order fulfillment times of the items and the customers' ETA's.

9. The computer-implemented method of claim 7 wherein the first user equipment device is associated with the first customer.

10. The computer-implemented method of claim 7 further comprising:

(f) transmitting from the retail sales facility computing device an order completion status message to the first user equipment device when the retail sales facility has completed the first order.

11. The computer-implemented method of claim 7 further comprising:

(f) transmitting from the retail sales facility computing device a query to the first user equipment device to receive updated location information from the first user equipment device; and (g) updating the order fulfillment queue using any updated location information received from the first user equipment device.

12. The computer-implemented method of claim 7 further comprising:

(f) transmitting from the retail sales facility computing device a query to the first user equipment device to receive updated location information from the first user equipment device; and (g) placing the first order on hold, and removing the order information for the first order from the order fulfillment queue when no updated location information is received from the first user equipment device.

* * * * *